UNITED STATES PATENT OFFICE.

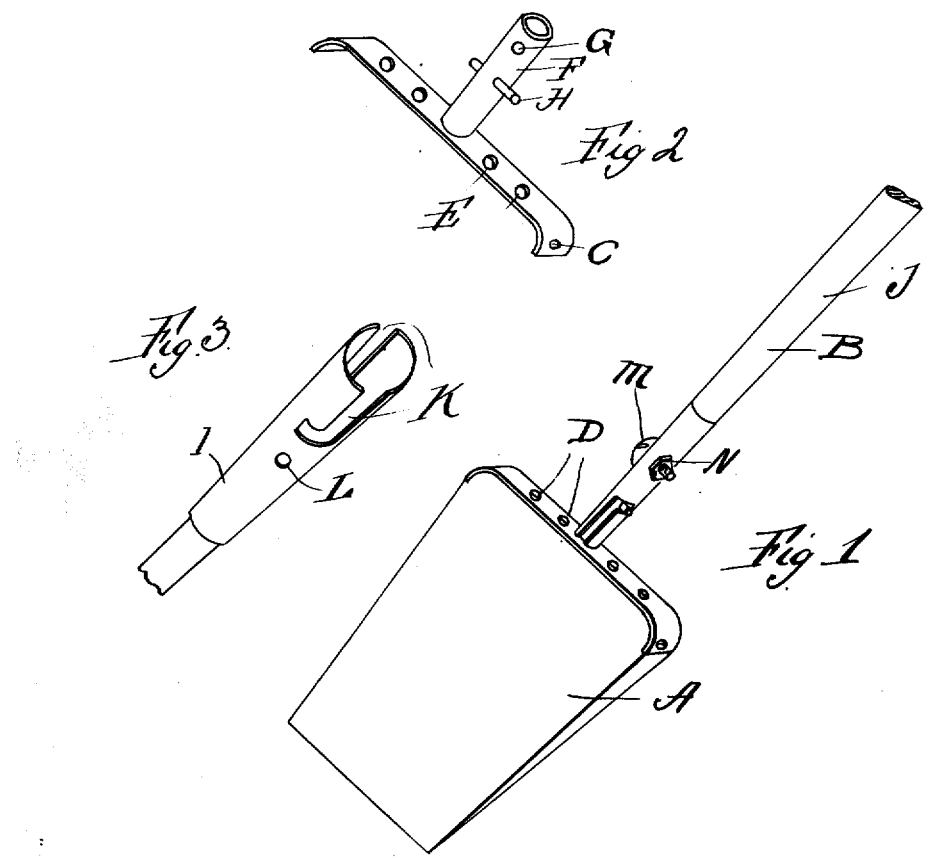

FRIEDRICH SCHUMACHER, OF PHILADELPHIA, PENNSYLVANIA.

BAKER'S PEEL.

No. 920,188.  Specification of Letters Patent.  Patented May 4, 1909.

Application filed April 28, 1908. Serial No. 429,691.

*To all whom it may concern:*

Be it known that I, FRIEDRICH SCHUMACHER, a subject of the King of Hungary, residing at Philadelphia, county of Philadelphia, and State of Pennsylvania, have invented a certain new and useful Improvement in Bakers' Peels, of which the following is a specification.

My invention relates to a new and useful improvement in baker's peel, and has for its object to provide an exceedingly simple and effective device of this character by means of which the handle may be readily removed or attached to the blade as the case may be.

In the manufacture of many kinds of bread it is customary to make the loaves directly upon the bottom of the hearth of the oven as distinguished from baking it in pans the shape of the loaf making it necessary or desirable that they should be baked in this manner. As each loaf is placed in the oven, the blade of the peel must be cleaned before the next loaf is placed thereon. But by the use of my improvement the number of peel blades may be used with only one handle.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification, in which—

Figure 1, is a perspective view of my improved peel, Fig. 2 a perspective view of the shank, and Fig. 3, a perspective view of the lower portion of the handle.

In carrying out my invention as here embodied, A represents a blade of the peel which may be of any usual construction and configuration. It differs from the ordinary peel in that it is easily separable from the handle B, the handle and blade being provided with interengaging parts of such a nature as to permit them to be connected so that the peel as a whole may be used as the ordinary baker's peel. As herein shown, to the blade is secured the plate C, by means of the screws D passing through the holes E formed in said blade. To this plate is fastened the rearwardly extending shank F which is formed from a piece of tubing. G indicates a hole passing through said shank F for the purpose herein after described.

H indicates a pin passing through the shank F extending beyond either side thereof. This shank is adapted to serve as a handle for the blade when the latter is used without its own detachable handle B and also serves as means for uniting the handle and blade.

I indicates the engaging portion of the detachable handle B used in manipulating the peel, this engaging portion being formed from a short piece of tubing, enough larger than the shank F as to allow it to fit closely about said shank, and this is secured to the inner end of the wooden portion J of the handle B. Cut from the engaging portion I and extending over its inner end rearwardly are the L shaped slots K. These L shaped slots being adapted to engage with the ends of the pin H.

L represents a hole cut in the engaging portion I of the handle B, and when this engaging portion is in position about the shank F, the hole L in the engaging portion I will be in alinement with the hole G in the shank F.

M indicates a screw which passes through the hole G in the shank F, and the hole L in the engaging portion I of the handle B, on the outer end of which is threaded the nut N, thus securing the blade of the peel to the handle so that it may be used with as much freedom as the ordinary peel in which the handle is permanently secured to the blade.

In practice I may employ a large number of blades A of the form described, and upon this I place the molded loaves of dough ready to be placed in the oven. At the proper time a detachable handle is brought into requisition, a single handle sufficing for any number of blades that may be used. The engaging portion of the handle is slipped over the shank F, the projecting ends of the pin H engaging with the L shaped slots K, until the pin is in alinement with the short portion of the L shaped slots K, when the handle is turned, thus engaging the pin H with the said short portion of the L shaped slots K. The peel with the loaf of dough thereon, is then placed in the oven, and the peel given a quick backward movement in this manner slipping the dough from the blade thereof, and the peel is then removed from the oven, the handle slipped from the blade, said blade laid aside, and the handle placed on a new blade with a loaf of dough thereon, ready to repeat the described operation. The construction of the handles and blades illustrated in the drawing permits of very rapid connection and separation of these parts before the loaves of dough have been baked, and when it is desired to remove them from the oven, one blade may be used, at which time it would be placed on the handle, the screw passed through the holes L in the detachable portion of the handle, and the hole G in the shank F. The nut N would then be screwed on the outer end of said screw, thus holding the blade and handle securely together.

Having thus fully described my invention what I claim as new and useful is—

A baker's peel comprising a blade, a plate having openings formed therein, screws for securing said plate to the blade, a shank made from a piece of tubing, having a hole therein secured to said plate, a pin passing through said shank the ends of which project beyond the sides of said shank, a wooden handle, the engaging portion having L shaped slots, a hole cut therein fastened to the lower end of said wooden handle, a screw adapted to pass through the holes formed in the shank, and the engaging portion, and a nut threaded on said screw, thus holding the handle and blade together.

In testimony whereof, I have hereunto affixed my signature in the presence of two subscribing witnesses.

FRIEDRICH SCHUMACHER.

Witnesses:
EDW. W. AUSTIN,
S. M. GALLAGHER.